United States Patent
Tsujiuchi et al.

(10) Patent No.: US 8,893,385 B2
(45) Date of Patent: Nov. 25, 2014

(54) LIQUID SUPPLY MEMBER, METHOD OF MAKING LIQUID SUPPLY MEMBER, AND METHOD OF MAKING LIQUID DISCHARGE HEAD

(75) Inventors: Naoko Tsujiuchi, Kawasaki (JP); Osamu Morita, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 12/898,884

(22) Filed: Oct. 6, 2010

(65) Prior Publication Data

US 2011/0083758 A1    Apr. 14, 2011

(30) Foreign Application Priority Data

Oct. 8, 2009 (JP) .................. 2009-234020

(51) Int. Cl.
| | |
|---|---|
| B21D 53/76 | (2006.01) |
| B23P 17/00 | (2006.01) |
| B41J 2/135 | (2006.01) |
| B29C 65/00 | (2006.01) |
| B29C 65/16 | (2006.01) |
| B41J 2/175 | (2006.01) |
| B41J 2/16 | (2006.01) |
| B29L 31/00 | (2006.01) |

(52) U.S. Cl.
CPC .......... *B29C 66/71* (2013.01); *B29C 66/30223* (2013.01); *B29C 66/112* (2013.01); *B29C 65/1654* (2013.01); *B29C 66/322* (2013.01); *B41J 2/17553* (2013.01); *B41J 2/16* (2013.01); *B41J 2/1752* (2013.01); *B41J 2/1623* (2013.01); *B29C 66/543* (2013.01); *B41J 2/17559* (2013.01); *B29C 66/1142* (2013.01); *B29C 66/114* (2013.01); *B29C 66/92651* (2013.01); *B29L 2031/7678* (2013.01); *B29C 65/1667* (2013.01); *B41J 2/1634* (2013.01); *B29C 66/547* (2013.01); *B29C 65/1635* (2013.01); *B29C 66/81267* (2013.01); *B29C 66/54721* (2013.01); *B41J 2/17513* (2013.01); *B29C 66/3242* (2013.01); *B41J 2/1753* (2013.01)
USPC ........................................... 29/890.1; 347/44

(58) Field of Classification Search
CPC ...... B41J 2/1603; B41J 2/1626; B41J 2/1631; B41J 2/1623
USPC ........................................... 29/890.1; 347/44
See application file for complete search history.

(56) References Cited

U.S. PATENT DOCUMENTS 4,313,124 A * 1/1982 Hara ............................ 347/57
4,345,262 A * 8/1982 Shirato et al. .................. 347/10
(Continued)

FOREIGN PATENT DOCUMENTS

| JP | 08-183182 A | 7/1996 |
|---|---|---|
| JP | 2005-096422 A | 4/2005 |

(Continued)

*Primary Examiner* — David Angwin
(74) *Attorney, Agent, or Firm* — Canon USA Inc. IP Division (57) ABSTRACT

A method of making a liquid supply member includes preparing a transparent member including a first surface having a first opening portion and an absorption member including a second surface having a second opening portion, making the transparent member and the absorption member contact each other at a contact portion so that the first opening portion and the second opening portion overlap each other with respect to an intersecting direction that intersects the first surface and the second surface, and forming a first supply path by welding the transparent member and the absorption member to each other by irradiating the contact portion with a laser beam, the first supply path including the first opening portion and the second opening portion and being a path through which liquid flows in the intersecting direction, wherein a space is formed between the contact portion and the first supply path and between the first surface and the second surface.

5 Claims, 10 Drawing Sheets

(56) References Cited

U.S. PATENT DOCUMENTS

| | | | |
|---|---|---|---|
| 4,459,600 A * | 7/1984 | Sato et al. | 347/47 |
| 4,463,359 A * | 7/1984 | Ayata et al. | 347/56 |
| 4,509,063 A * | 4/1985 | Sugitani et al. | 347/65 |
| 4,521,787 A * | 6/1985 | Yokota et al. | 347/65 |
| 4,558,333 A * | 12/1985 | Sugitani et al. | 347/65 |
| 4,608,577 A * | 8/1986 | Hori | 347/66 |
| 4,609,427 A * | 9/1986 | Inamoto et al. | 216/27 |
| 4,636,609 A * | 1/1987 | Nakamata | 219/121.64 |
| 4,666,823 A * | 5/1987 | Yokota et al. | 430/320 |
| 4,698,645 A * | 10/1987 | Inamoto | 347/65 |
| 4,723,129 A * | 2/1988 | Endo et al. | 347/56 |
| 4,740,796 A * | 4/1988 | Endo et al. | 347/56 |
| 5,126,768 A * | 6/1992 | Nozawa et al. | 347/65 |
| 5,478,606 A * | 12/1995 | Ohkuma et al. | 427/555 |
| 5,578,418 A * | 11/1996 | Noguchi et al. | 430/280.1 |
| 5,808,641 A * | 9/1998 | Miyagawa et al. | 347/65 |
| 6,176,012 B1 * | 1/2001 | Ishimatsu | 29/890.1 |
| 6,361,140 B1 * | 3/2002 | Ishimatsu et al. | 347/20 |
| 6,421,623 B1 * | 7/2002 | Furukawa et al. | 702/100 |
| 6,423,934 B2 * | 7/2002 | Hasegawa et al. | 219/121.71 |
| 6,527,377 B1 * | 3/2003 | Ikegame et al. | 347/56 |
| 6,604,266 B1 * | 8/2003 | Tajima et al. | 29/25.35 |
| 6,659,588 B2 * | 12/2003 | Ikegame et al. | 347/40 |
| 6,668,454 B2 * | 12/2003 | Hasegawa et al. | 29/890.1 |
| 6,719,405 B1 * | 4/2004 | Powers | 347/62 |
| 6,799,831 B2 * | 10/2004 | Inamoto et al. | 347/44 |
| 6,974,207 B2 * | 12/2005 | Drummond et al. | 347/49 |
| 6,980,296 B2 * | 12/2005 | Kwan et al. | 356/432 |
| 7,245,378 B2 * | 7/2007 | Kwan et al. | 356/432 |
| 7,274,856 B2 * | 9/2007 | Drummond | 385/147 |
| 7,282,665 B2 * | 10/2007 | Chen et al. | 219/121.67 |
| 7,571,541 B2 * | 8/2009 | Silverbrook et al. | 29/890.1 |
| 7,971,358 B2 * | 7/2011 | Morita | 29/890.1 |
| 8,087,168 B2 * | 1/2012 | Silverbrook et al. | 29/890.1 |
| 8,210,647 B2 * | 7/2012 | Shimazu et al. | 347/44 |
| 8,251,496 B2 * | 8/2012 | Hattori et al. | 347/63 |
| 2007/0195137 A1 * | 8/2007 | Morita | 347/85 |

FOREIGN PATENT DOCUMENTS

| | | |
|---|---|---|
| JP | 2005-271315 A | 10/2005 |
| JP | 2006-341557 A | 12/2006 |

* cited by examiner

LIQUID SUPPLY MEMBER, METHOD OF MAKING LIQUID SUPPLY MEMBER, AND METHOD OF MAKING LIQUID DISCHARGE HEAD

BACKGROUND OF THE INVENTION

1. Field of the Invention

The present invention relates to a liquid supply member that supplies liquid to a liquid discharge port that discharges a liquid, a method of making a liquid supply member, and a method of making a liquid discharge head.

2. Description of the Related Art

A typical example of a liquid discharge head is an inkjet recording head. An inkjet recording head includes a recording element unit that discharges ink and a tank holder unit that holds an ink tank. The tank holder unit includes a tank holder and a supply path plate.

Ink is guided from an ink tank through a supply path formed in the tank holder unit to the recording element unit and supplied to a discharge port that discharges the ink.

Figure 9A:
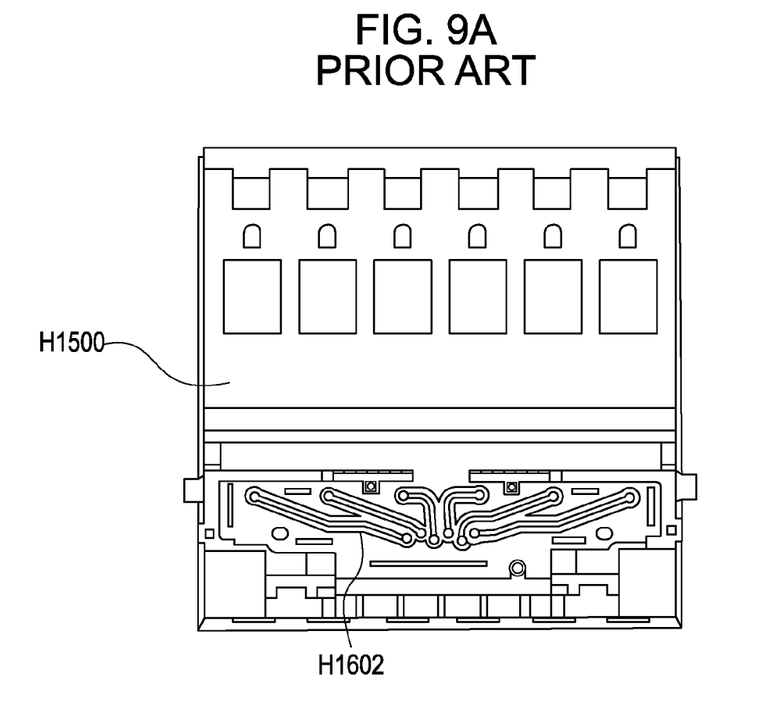
FIGS. 9A and 9B are plan views of an existing liquid discharge head.
Figure 9B:
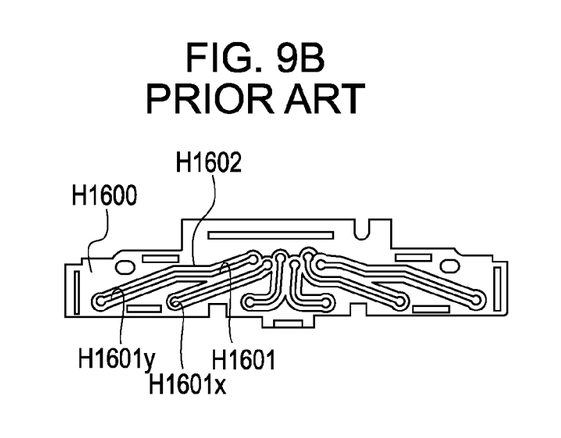

FIG. 9A is a bottom view of a tank holder H1500, and FIG. 9B is a top view of a supply path plate H1600. Opening portions that serve as the supply path are formed in the tank holder H1500 and the supply path plate H1600.

A supply path H1601 is formed by joining the supply path plate H1600 to the tank holder H1500 so that surfaces H1602 having the opening portions face each other. A member having the supply path H1601 is a liquid supply member. The supply path H1601 includes a supply path H1601x through which liquid flows in a direction that intersects the surfaces H1602 having the opening portions and a supply path H1601y through which ink flows in a direction parallel to the surfaces H1602 (FIG. 9B).

Japanese Patent Laid-Open No. 2005-096422 describes a laser welding method that can be used for joining the tank holder H1500 to the supply path plate H1600.

In general, the term "laser welding" refers to a method of joining a member that is transparent to a laser beam and a member that is capable of absorbing a laser beam together by making these members contact each other at a portion to be welded and irradiating the portion to be welded with a laser beam. As compared with ultrasonic welding, laser welding has an advantage in that foreign matter is negligibly generated at the welded portion, and laser welding is used as an effective way of forming a supply path.

Figure 10A:
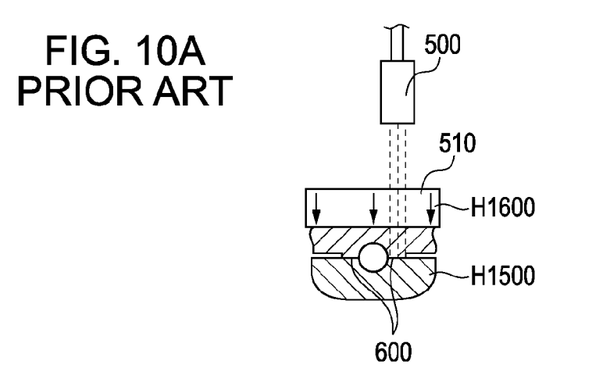
FIGS. 10A to 10C illustrate a problem related to laser welding.
Figure 10B:
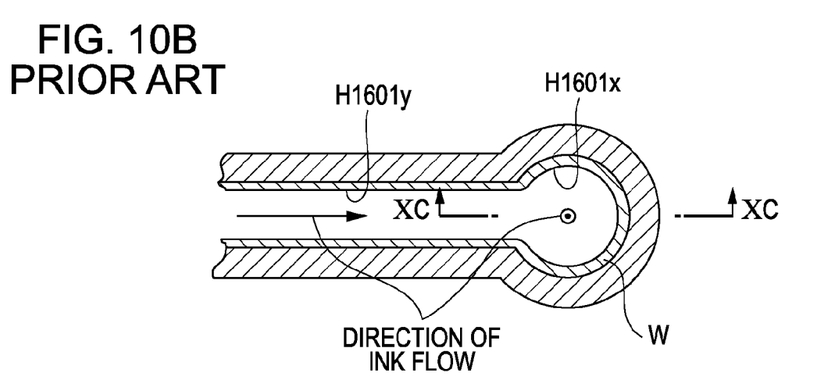
Figure 10C:
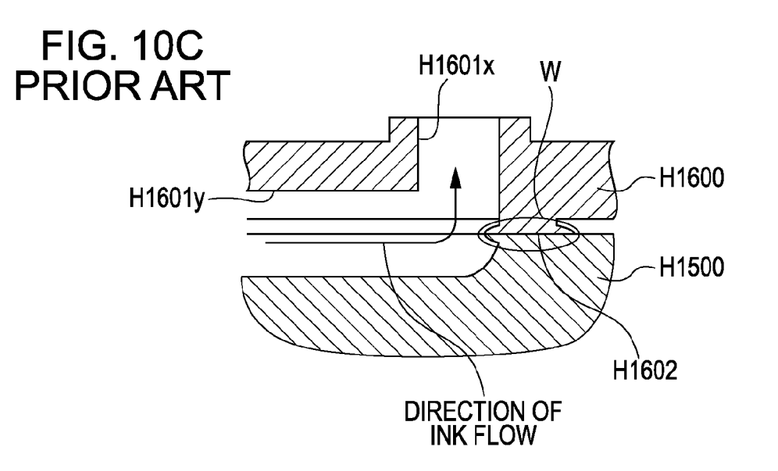

Referring to FIGS. 10A through 10C, a method of forming the supply path H1601 by the laser welding described in Japanese Patent Laid-Open No. 2005-096422 will be described. First, the tank holder H1500, which is capable of absorbing a laser beam, and the supply path plate H1600, which is transparent to a laser beam, are made to contact each other using a press jig 510. Subsequently, while the tank holder H1500 and the supply path plate H1600 are in contact with each other, a contact portion 600 is irradiated with a laser beam (FIG. 10A), so that a supply path is formed.

Because the contact portion 600 is disposed so as to form a part of the supply path H1601, after the laser welding, a melted portion W of the contact portion 600 protrudes to the supply path H1601 (FIG. 10C).

FIG. 10C is a sectional view taken along line XC-XC of FIG. 10B. As illustrated in FIG. 10C, if the melted portion W, which is generated by the laser welding, protrudes by a large amount to the supply path H1601x through which ink flows in a direction that intersects the surface H1602, the ink flow may be impeded. In particular, a supply path formed in an inkjet recording head is very small, so that the possibility of such impedance of the ink flow is high, and the performance of ink supply to a discharge head may decrease.

SUMMARY OF THE INVENTION

The present invention provides a method of making a liquid supply member with which impedance of ink flow is reduced.

According to an aspect of the present invention, a method of making a liquid supply member, the liquid supply member including a supply path through which liquid is supplied to a discharge port that discharges liquid, includes a preparation step of preparing a transparent member and an absorption member, the transparent member including a first surface in which a first opening portion is formed and being transparent to a laser beam, and the absorption member including a second surface in which a second opening portion is formed and being capable of absorbing a laser beam; a contact step of making the transparent member and the absorption member contact each other at a contact portion in such a manner that the first opening portion and the second opening portion overlap each other with respect to an intersecting direction that intersects the first surface and the second surface that are disposed so as to face each other; and a welding step of forming a first supply path by welding the transparent member and the absorption member to each other by irradiating the contact portion with the laser beam through the transparent member, the first supply path including the first opening portion and the second opening and being a path through which the liquid flows in the intersecting direction, wherein, after the contact step and before the welding step, a space is formed between the contact portion and the first supply path and between the first surface and the second surface.

According to another aspect of the present invention, a liquid supply member is made by making a plurality of members contact each other and welding the members together using a laser beam so that a space is formed between the surfaces of the members and in a supply path through which ink flows in a direction that intersects the surfaces. As a result, a melted portion, which is melted by a laser beam, flows into the space, so that protrusion of the melted portion toward the inside of the supply path is eliminated or the amount of protrusion of the melted portion is decreased. Thus, impedance of ink flow can be reduced.

Further features of the present invention will become apparent from the following description of exemplary embodiments with reference to the attached drawings.

DESCRIPTION OF THE EMBODIMENTS

A liquid discharge head according to an embodiment will be described using an example of a general inkjet recording head.

Figure 7:
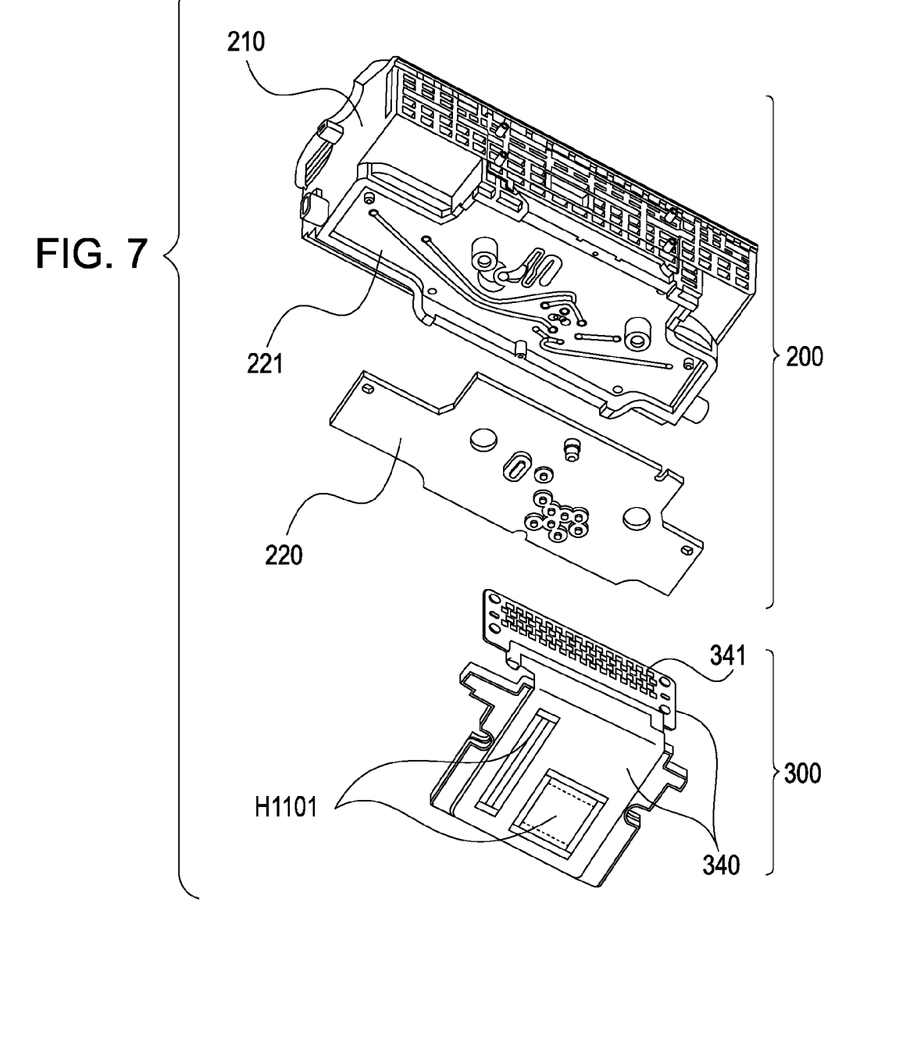
FIG. 7 is an exploded perspective view illustrating a liquid discharge head to which the present invention is applicable.

As illustrated in FIG. 7, an inkjet recording head includes a recording element unit 300 that discharges ink and a tank holder unit 200 that holds an ink tank (not shown).

Figure 8:
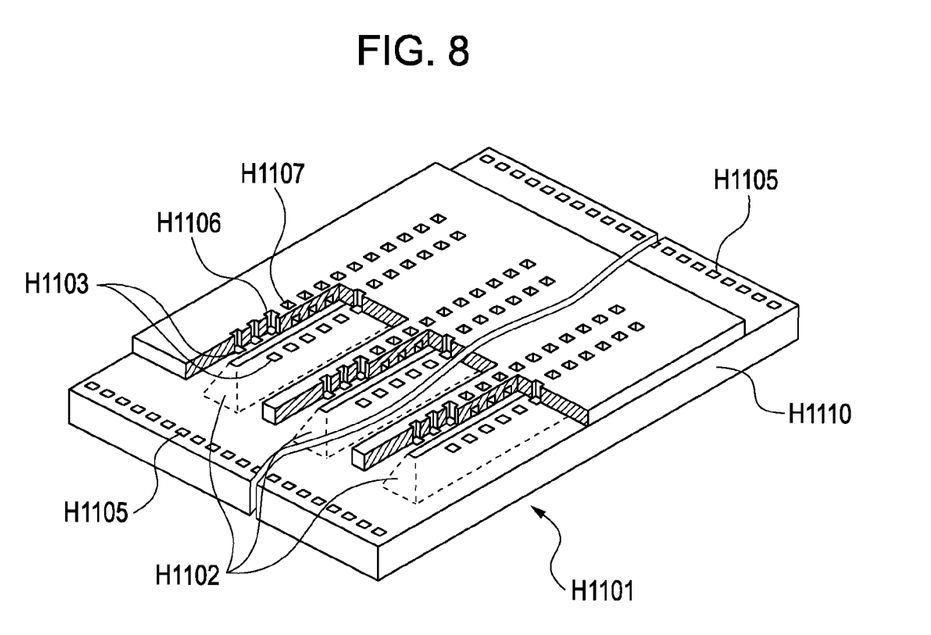
FIG. 8 is a perspective view illustrating a recording element substrate of a general liquid discharge head.

The recording element unit 300 includes an electronic wiring substrate 340 and a recording element substrate H1101. FIG. 8 is a partial cutaway perspective view of the recording element substrate H1101. Examples of recording elements include heat generating resistive elements and piezoelectric elements. A recording head using heat generating resistive elements will be described here.

The recording element substrate H1101 includes discharge ports H1107 for discharging ink and ink supply ports H1102 that communicate with the discharge ports and supply ink to the discharge ports. The discharge ports are formed in a discharge port forming member H1106, and the ink supply ports are formed in a silicon substrate H1110.

The silicon substrate H1110 has a thickness in the range from 0.5 to 1.0 mm. The ink supply ports H1102 are formed in the silicon substrate H1110 by anisotropic etching. Moreover, heat generating resistive elements H1103 are formed on the silicon substrate H1110. The discharge ports H1107 are formed in the silicon substrate H1110 by photolithography in such a manner that the discharge ports H1107 correspond to the heat generating resistive elements H1103. Furthermore, bumps H1105 made of gold or the like are disposed on the silicon substrate H1110. The bumps H1105 serve as electrode portions for supplying electric signals and electric power for driving the heat generating resistive elements H1103.

Referring to FIG. 7, the tank holder unit 200, which includes members that characterize the present invention, will be described in detail.

The tank holder unit 200 includes a tank holder 210 and a transparent member 220. The tank holder 210 holds an ink tank (not shown), which is a liquid container, and includes an absorption member 221 that is capable of absorbing a laser beam. The transparent member 220 is a plate-shaped member that is transparent to a laser beam. By joining the transparent member 220 to the tank holder 210, a liquid supply member having a supply path for supplying ink to the ink supply port H1102 is formed.

In the embodiment of the invention, the absorption member 221 is integrally formed with the tank holder 210. However, the absorption member 221 and the tank holder 210 may be independently formed, and subsequently the absorption member 221 may be attached to the tank holder 210.

In the embodiment of the present invention, in order that a laser beam can be easily irradiated, a plate-shaped member is used as the transparent member 220 that is transparent to a laser beam, and a member that is integrally formed with the tank holder 210 is used as the absorption member 221. However, which of the members is provided with transparency or absorption can be appropriately changed.

In the present invention, the term "a transparent member that is transparent to a laser beam" refers to a member having a transmittance equal to or greater than 30% when the member having a thickness of 2.0 mm is irradiated with a laser beam. The term "an absorption member that is capable of absorbing a laser beam" refers to a member having an absorptance equal to or greater than 90% when the member having a thickness of 2.0 mm is irradiated with a laser beam. By using the members having such transmittance and absorptance, the transparent member and the absorption member can be welded by laser welding.

In the embodiment, transparent Noryl "TPN9221" (made by SABIC Innovative Plastics that was formerly GE Plastics) is used as a material of the transparent member. Transparent Noryl is a transparent material that allows a laser beam to pass therethrough and is highly resistant to corrosion caused by ink. Alternatively, transparent Noryl "TN300" (made by SABIC Innovative Plastics), which does not include a coloring material, can be used as a material of the transparent member.

The term "Noryl" is a trade name for modified polyphenylene ether or modified polyphenylene oxide. Noryl is a thermoplastic resin made by modifying polyphenylene ether (polyphenylene oxide) so as to increase heat resistance and strength. Noryl also has a strong resistance to acids and alkalis.

As a material of the absorption member, black Noryl "SE1X" (made by SABIC Innovative Plastics), which includes dye or pigment that absorbs a laser beam, is used.

Hereinafter, embodiments of the present invention will be described in detail with reference to the drawings.

First Embodiment

Referring to FIGS. 1A to 3, a first embodiment of the present invention will be described in detail.

Figure 2A:
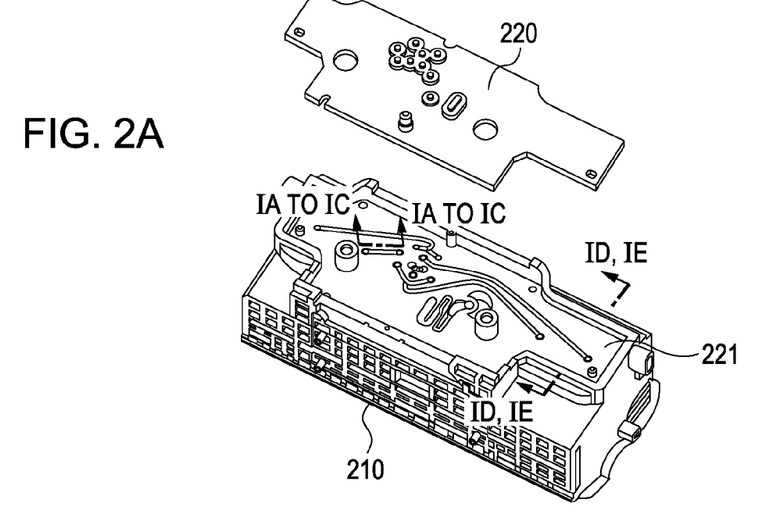
FIGS. 2A to 2C are perspective views illustrating a process of making an inkjet recording head according to an embodiment of the present invention by laser welding.
Figure 2B:
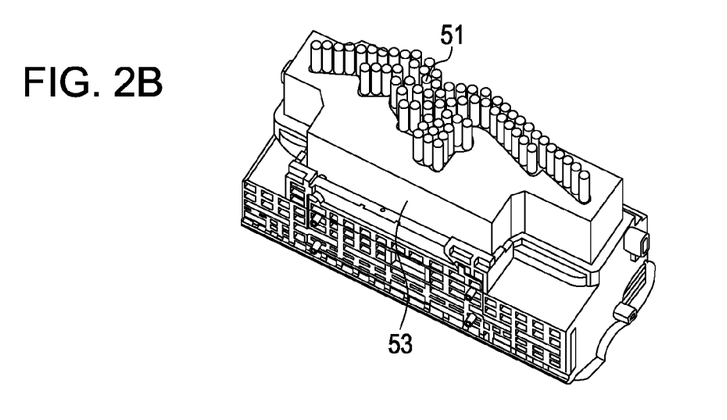
Figure 2C:
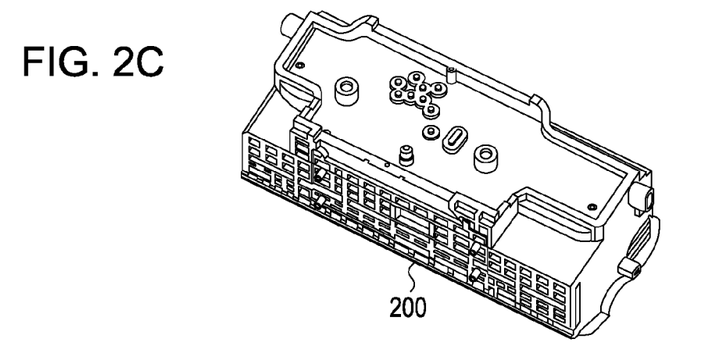

FIGS. 2A to 2C are perspective views illustrating a process of making a liquid supply member by attaching the transparent member 220 to the tank holder 210 including the absorption member 221 by using a laser welding method.

FIG. 2A illustrates the step of preparing the transparent member 220 and the absorption member 221, which is integrally formed with the tank holder 210, and making the transparent member 220 and the absorption member 221 contact each other. FIG. 2B illustrates the step of pressing the transparent member 220 using a press jig 53, which is designed so as to allow a region in the periphery of a supply path 224 to be irradiated with a laser beam, so that the transparent member closely contacts the absorption member, and irradiating these members with a laser beam emitted by a laser irradiation apparatus 51 after the contact step illustrated in FIG. 2A has been finished.

FIG. 2C illustrates a state in which the transparent member 220 and the absorption member 221 are joined together (the tank holder unit 200).

Figure 1A:
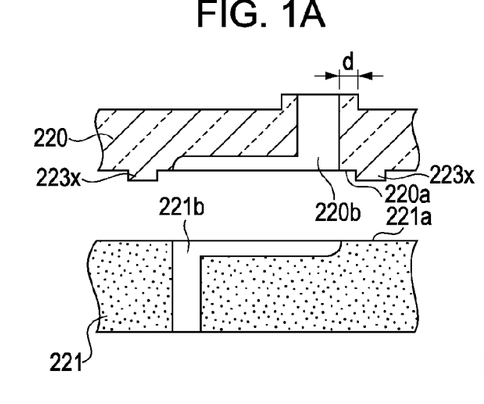
FIGS. 1A to 1E illustrate a first embodiment of the present invention.
Figure 1B:
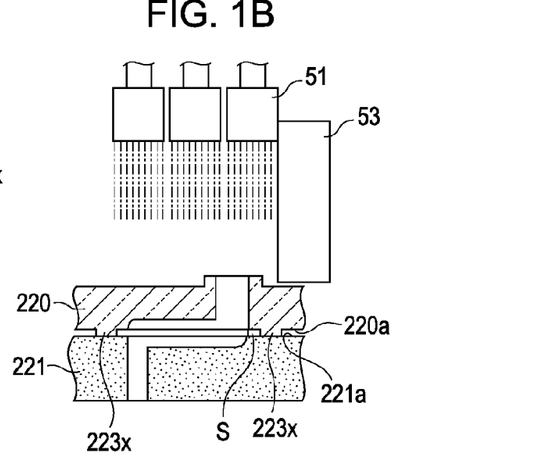
Figure 1C:
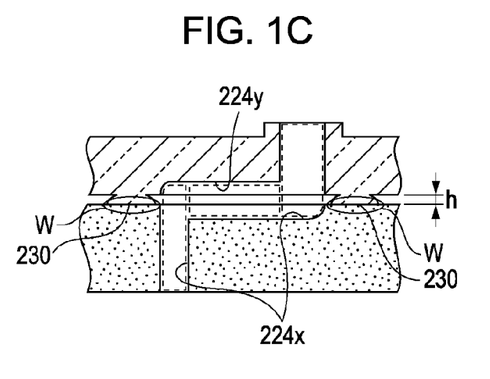
Figure 1D:
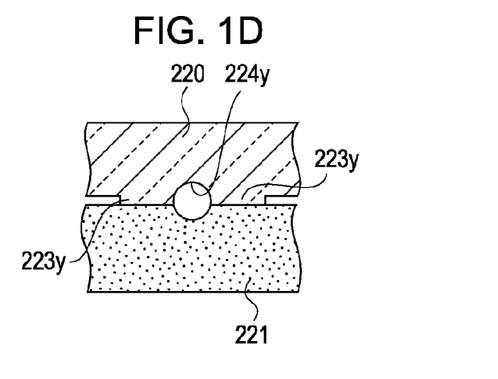
Figure 1E:
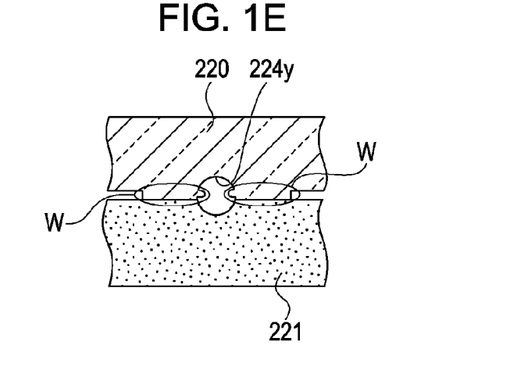

FIGS. 1A to 1C are sectional views taken along line (IA to IC)-(IA to IC) of FIG. 2A, and FIGS. 1A to 1C correspond to FIGS. 2A to 2C, respectively. FIGS. 1D and 1E are sectional views taken along line ID, IE-ID, IE of FIG. 2A, and FIGS. 1D and 1E correspond to FIGS. 2A and 2C, respectively.

Referring to FIGS. 1A to 1E, the specific structure of the liquid supply member including the transparent member 220 and the absorption member 221 will be described.

Hereinafter, a surface of the transparent member 220 that contacts the absorption member 221 will be referred to as a first surface 220a, and a surface of the absorption member 221 that contacts the transparent member 220 will be referred to as a second surface 221a. A first opening portion 220b and a second opening portion 221b, which are included in the supply path 224, are formed in the first surface 220a and the second surface 221a, respectively.

In order to form the supply path, the transparent member 220 and the absorption member 221 are made to contact each other so that the first opening portion 220b and the second opening portion 221b overlap each other with respect to a direction that intersects the first surface 220a and the second surface 221b, and the transparent member 220 and the absorption member 221 are welded to each other by laser welding. The supply path 224 is formed in an area in which the first opening portion 220b and the second opening portion 221b overlap each other. The supply path 224 includes a first supply path 224x and a third supply path 224y (FIG. 1C). The first supply path 224x, which includes the first opening portion 220b and the second opening portion 221b, is a supply path through which ink flows in a direction that intersects the first surface 220a and the second surface 221a (in the present embodiment, in a direction that is perpendicular to the first surface 220a and the second surface 221a). The third supply path 224y is a supply path through which ink flows in a direction that is parallel to the first surface 220a and the second surface 221a.

Thus, in the present invention, the term "first supply path" refers to a supply path that includes opening portions respectively formed in surfaces of a plurality of members that face each other and through which ink flows in a direction that intersects the surfaces. In the present invention, the term "third supply path" refers to a supply path through which ink flows in a direction that is parallel to the surfaces that face each other.

Next, a contact portion will be described. The contact portion is a portion at which the transparent member 220 and the absorption member 221 contact each other and at which the transparent member 220 and the absorption member 221 are melted and welded together by being irradiated with a laser beam.

The transparent member 220 and the absorption member 221 contact each other at a contact portion 223 in the periphery of the supply path 224 that is irradiated with a laser beam. The transparent member 220 and the absorption member 221 does not contact each other in a non-contact portion that is not irradiated with the laser beam.

By providing the contact portion and the non-contact portion, when the transparent member 220 is made to contact the absorption member 221, pressure is concentrated on the contact portion 223 so that contact at the contact portion becomes closer.

As illustrated in FIG. 1C, when the contact portion 223 is irradiated with a laser beam, dye or pigment included in the absorption member 221 is heated and resin is melted. The heat generated at this time is transferred to the transparent member 220 and melts the transparent member 220, whereby a joint surface 230 is formed. At this time, since the heat is efficiently transferred to the contact portion 223. Moreover, because contact is close at the contact portion 223, the joint surface 230 illustrated in FIG. 1C is strongly formed.

In the first embodiment, the contact portion 223 protrudes from the first surface 220a of the transparent member 220.

Next, a contact portion 223x, which characterizes the present invention, will be described. The contact portion 223x is a part of the contact portion 223 that is in the periphery of the first supply path 224x. As illustrated in FIG. 1A, the contact portion 223x in the periphery of the first supply path is formed at a position that is recessed from a surface of the first supply path 224x. That is, when the transparent member 220 and the absorption member 221 are made to contact each other, a space S is formed between the first supply path 224x and the contact portion 223x and between the first surface 220a and the second surface 221a (FIG. 1B).

As illustrated in FIG. 1C, after the welding, a part or all of the space S is filled with a portion of the contact portion 223x that is cured after being melted (melted portion W), whereby protrusion of the melted portion W to the first supply path 224x is eliminated or the amount of protrusion is small. Thus, the impedance of ink flow due to the protrusion of the melted portion to the first supply path 224x can be reduced.

Figure 3:
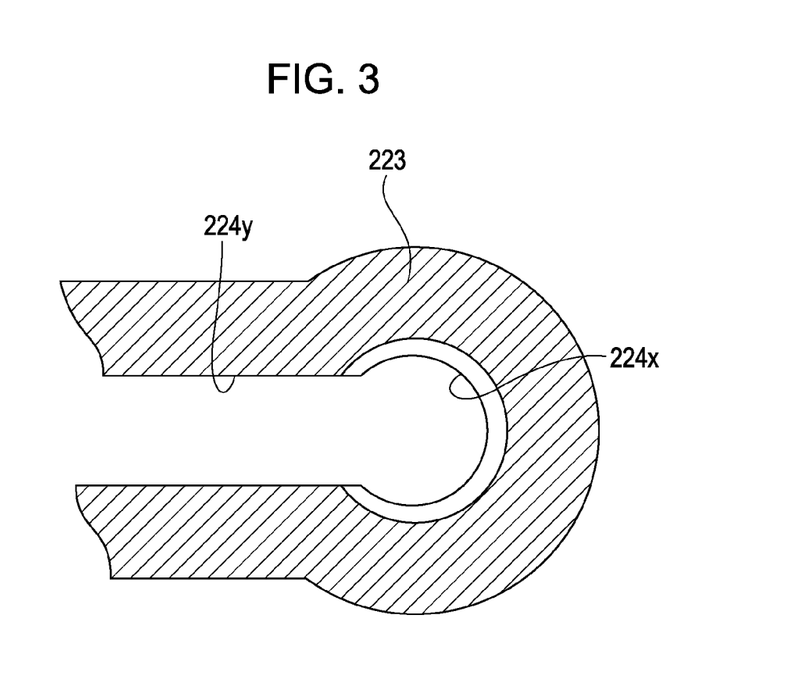
FIG. 3 is a sectional view illustrating the first embodiment of the present invention.

Referring to FIG. 3, the contact portion 223x in the periphery of the first supply path 224x is disposed along the periphery the first supply path 224x in a cross-sectional view taken along a plane that is perpendicular to the direction of ink flow. On the other hand, a contact portion in the periphery of the third supply path 224y (FIG. 1C), through which ink flows parallel to the first and second surfaces 220a and 221a, is disposed so as to be parallel to the direction of ink flow. That is, the proportion of the area of the contact portion to the area of the first supply path 224x in the cross-sectional view taken along a plane perpendicular to the direction of ink flow is larger than that for the third supply path 224y. Therefore, the amount of protrusion of the melted portion in the first supply path 224x is larger than that in the third supply path 224y, and the decrease in the cross-sectional area due to the protrusion of the melted portion, which is made when the contact portion is melted, to the first supply path 224x is larger than that for the third supply path 224y. Thus, the problem that the ink flow is impeded due to the decrease in the cross-sectional area of the supply path after the welding and the performance of ink supply to the discharge port decreases is more likely to arise in the first supply path 224x.

By disposing the contact portion 223x so as to form the space S as described above, the protrusion of the melted portion W toward the inside of the first supply path 224x is eliminated or the amount of protrusion of the melted portion W is decreased. Thus, reduction in the cross-sectional area of the supply path can be eliminated or decreased, whereby the impedance of ink flow can be suppressed.

The space S may not be completely filled with the melted portion after the welding and a part of the space S may remain. Alternatively, the space S may be filled with the melted portion, and the melted portion may protrude toward the first supply path 224x. However, if the space S is not completely filled with the melted portion and a part of the space S remains or if the space S is exactly filled with the melted portion and the melted portion does not protrude to the supply path, the impedance of ink flow due to the protrusion of the melted portion can be reduced.

The height h (FIG. 1C) of the gap between the transparent member 220 and the absorption member 221, the gap being a part of the space S that is not filled with the melted portion, can be equal to or smaller than 0.1 mm so that bubbles may not accumulate in the gap.

In an example of the present embodiment, the height of the contact portion 223x relative to the first surface 220b is 0.1 mm before welding and contraction of the transparent member 220 in a direction toward the absorption member 221 due to melting of the contact portion is 0.02 mm. Therefore, after the welding, the height h of the gap between the transparent member 220 and the absorption member 221 is 0.08 mm.

In the example of the present embodiment, the cross-sectional area of the first supply path 224x is 2.0 mm$^2$, the width of the contact portion is 1.0 mm, the distance d between the first supply path 224x and the contact portion 223x (FIG. 1A) is 0.2 mm.

In general, examples of laser irradiation methods include a scanning method and a simultaneous irradiation method. With the scanning method, the laser irradiation apparatus 51 focuses a laser beam to a small spot and irradiates a contact portion with the laser beam along a path in the contact portion in a scanning manner. With the simultaneous irradiation method, a plurality of light sources that are arranged along the supply path 224 irradiate the contact portion with laser beams in one go (FIG. 2B). With the simultaneous irradiation method, members are welded to each other by being simultaneously irradiated with laser beams while the members are made to contact each other with the press jig 53 so that the contact portion 223 is depressed. As compared with the scanning method, the amount of protrusion of the melted portion W to the supply path is large. That is, the problem of impedance of ink flow by the melted portion W, which may arise with the scanning method, is more likely to arise when the simultaneous irradiation method is used. Therefore, when performing laser welding by using the simultaneous irradiation method, the contact portion 223x can be configured so that the space S is formed (FIG. 1B).

Next, a contact portion 223y will be described. The contact portion 223y in the periphery of the third supply path 224y (FIG. 1C) through which ink flows in a direction parallel to the first and second surfaces 220a and 221a. If the contact portion 223y is configured so as to form a space S between the third supply path 224y and the contact portion 223y and between the first surface 220a and the second surface 221a as in the case of the contact portion 223x in the periphery of the first supply path, the following problem may arise. That is, in the case of the third supply path 224y, a gap in the space S that is not completely filled by welding extends in the direction of ink flow. Therefore, bubbles easily enter the gap as compared with the case of the first supply path 224x through which ink flows in a direction that intersects the first surface 220a and the second surface 221a. The bubbles, which have entered the gap and adhered to the wall of the gap, are not easily removed, may grow larger, and may affect the ink supply performance.

For these reasons, when the contact portion 223y is configured so as to form the space S when the transparent member 220 and the absorption member 221 are made to contact each other, the contact portion 223y can be disposed at a position such that the space S is filled after welding. Alternatively, the contact portion 223y in the periphery of the third supply path 224y can be disposed so that the contact portion 223y forms a part of the third supply path 224y without forming the space S (FIG. 1D).

Moreover, in order to dispose the third supply path 224y with a high density while providing an enough welding area that enables a secure welding, the contact portion 223y can be disposed so that the contact portion 223y forms a part of the third supply path 224y without forming the space S (FIG. 1D). By disposing the contact portion 223y in this manner, the amount of protrusion of the melted portion to the third supply path 224y is not reduced. However, even if the amount of protrusion of the melted portion to the third supply path 224y is not reduced, this does not cause a problem for the following reasons.

Regarding the third supply path 224y, if the melted portion, which is generated when the contact portion is melted, protrudes to the supply path, the shape of the melted portion extends in the direction of ink flow. Therefore, the protrusion of the melted portion to the supply path does not substantially affect the ink flow.

Moreover, as described above, the contact portion 223x in the periphery of the first supply path is provided along the periphery of the first supply path, while the contact portion 223y in the periphery of the third supply path is provided so as to extend in the direction of the ink flow. Therefore, the decrease in the cross-sectional area of the third supply path 224y due to the protrusion of the melted portion after welding is smaller than that of the first supply path 224x.

For these reasons, in terms of the ink flow, the contact portion 223y may be configured so that the contact portion 223y in the periphery of the third supply path forms a part of the supply path (FIG. 1D).

In terms of the design, it is difficult to provide the contact portion 223y so that the space S is formed when the transparent member 220 and the absorption member 221 are made to contact each other and so that the space S is completely filled with a portion that has been melted and cured after welding. Thus, also in terms of the design, the contact portion can be configured as illustrated in FIG. 1D.

As described above, in the present embodiment, in the periphery of the first supply path 224x, a non-contact portion is provided between the contact portion and the supply path, and, in the periphery of the third supply path 224y, a non-contact portion is not provided between the contact portion and the third supply path 224y and the contact portion forms a part of the contact portion. In the example of the present embodiment, the third supply path 224y has a width of 1.2 mm, and the contact portion 223y has a width of 1.0 mm.

FIG. 3 illustrates the shape of a contact portion of the embodiment of the present embodiment at which the first supply path 224x and the third supply path 224y of the transparent member 220 are connected to each other. If a melted portion protrudes to the first supply path 224x after welding, the ink flow may be impeded. Therefore, the contact portion 223 can be configured so that the space S is formed along the periphery of the first supply path 224x before welding.

Referring to FIGS. 4A to 4H, modifications of the first embodiment will be described.

Figure 4A:
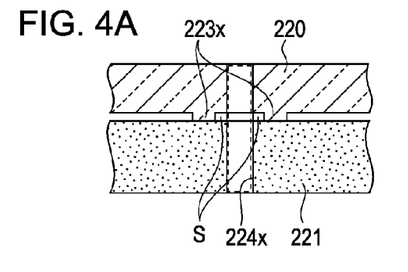
FIGS. 4A to 4H are sectional views illustrating modifications of the first embodiment of the present invention.
Figure 4B:
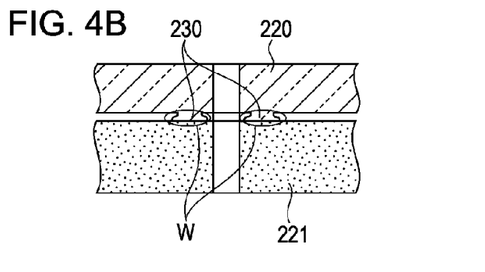

FIGS. 4A and 4B illustrate a modification in which only the first supply path 224x, which includes the first opening portion 220b and the second opening portion 221b and being a path through which liquid flows in a direction that intersects the first surface 220a and the second surface 221a, is provided. FIG. 4A illustrates the modification when the transparent member 220 and the absorption member 221 are made to contact each other, and FIG. 4B illustrates the modification when these members are welded to each other. As in this case, only the first supply path 224x may be provided without providing the third supply path 224y included in the embodiment illustrated FIGS. 1A to 1E.

Figure 4C:
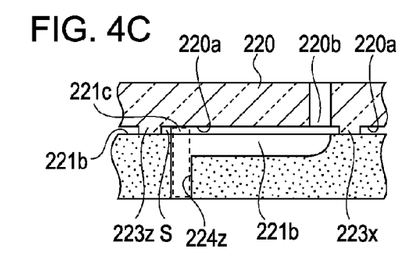
Figure 4D:
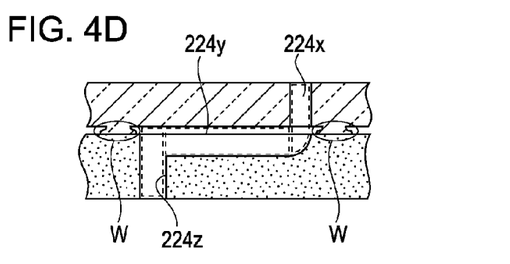

Referring to FIGS. 4C and 4D, another modification will be described. In the liquid supply member illustrated in FIGS. 1A to 1E, the first opening portion 220b is included in the first supply path 224x and in the third supply path 224y. In contrast, in the modification illustrated in FIGS. 4C and 4D, the first opening portion 220b is configured to form only the first supply path 224x and not to form the third supply path 224y through which ink flows parallel to the first surface 220a and the second surface 221a. FIG. 4C illustrates the modification when the transparent member 220 and the absorption member 221 are made to contact each other, and FIG. 4D illustrates the modification when these members are welded to each other. In the present modification, a second supply path 224z is formed by a part of the first surface 220a in which an opening portion is not formed and a part of the second opening portion 221b. In the present modification, the second supply path 224z is provided so as to include a part of the first surface 220a in which an opening portion is not formed and a part of the second opening portion (third opening portion 221c). Ink flows through the second supply path 224z in a direction that intersects the first surface 220a and the second surface 221a.

In the present modification, the direction that intersects the first surface 220a and the second surface 221a is perpendicular to these surfaces.

Thus, in the present invention, the term "second supply path" refers to a supply path including a part of one of surfaces of a plurality of members that face each other, the part not having an opening portion formed therein, and an opening portion formed in the other of the surfaces and being a path through which ink flows in a direction that intersects the surfaces that face each other.

As with the contact portion 223x disposed in the periphery of the first supply path 224x, the contact portion 223z disposed in the periphery of the second supply path 224z is disposed along the periphery of the second supply path 224z. Therefore, as compared with the third supply path 224y through which ink flows in a direction parallel to the first surface 220a and the second surface 221b, reduction in the cross-sectional area of the supply path after welding is large, so that the ink flow may be impeded. By configuring the contact portion 223z so that the space S is formed (FIG. 4C), protrusion of the melted portion W to the second supply path 224z after welding is eliminated or the amount of protrusion is reduced (FIG. 4D). Thus, the reduction in the cross-sectional area of the supply path is suppressed, and the impedance of the ink flow can be reduced.

It is not necessary that the space S be completely filled with the melted portion after welding, and a part of the space S may remain. Alternatively, the space S may be filled with the melted portion, and the melted portion may protrude toward the inside of the second supply path 224z. If the space S is not completely filled with the melted portion and a part of the space S remains, or if the space S is exactly filled with the melted portion and the melted portion does not protrude to the supply path, reduction in the cross-sectional area due to protrusion of the melted portion can be efficiently suppressed.

In the modification illustrated in FIG. 4C, the third opening portion 221c is formed in the second surface 221a of the absorption member 221. The third opening portion may be formed in the first surface 220a of the transparent member 220, and the third supply path 224y may not include the third opening portion and the opening portion in the second surface 221a.

Figure 4E:
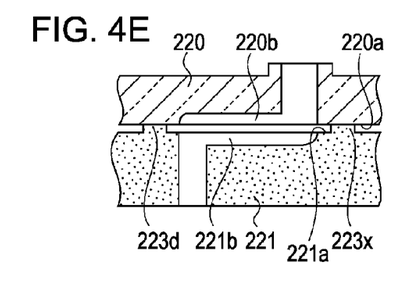
Figure 4F:
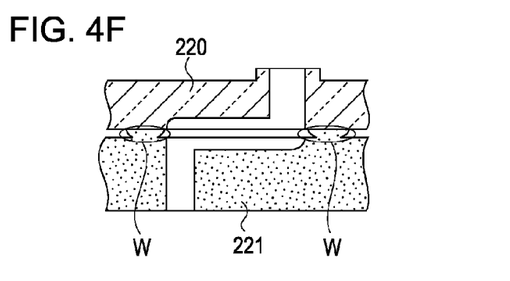
Figure 4G:
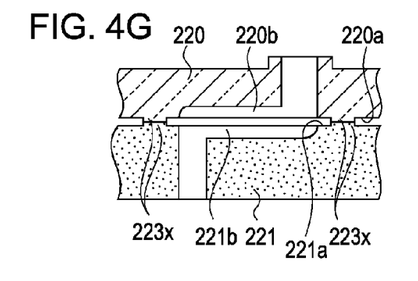
Figure 4H:
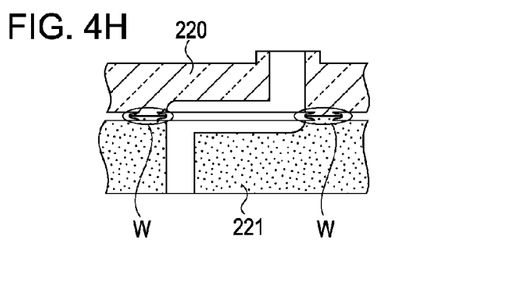

In the modifications described above, the contact portion 223 (contact portions 223x, 223y, and 223z) are formed only on the first surface 220a. However, the contact portion 223 may be formed on the second surface 221b. (FIG. 4E illustrates such a modification when the transparent member 220 is made to contact the absorption member 221, and FIG. 4F illustrates a state in which these members are welded to each other.) The contact portion 223 may be formed on the first surface 220a and an on the second surface 221b. (FIG. 4G illustrates such a modification when the transparent member 220 is made to contact the absorption member 221, and FIG. 4H illustrates the modification when these members are welded to each other.)

Second Embodiment

Figure 5A:
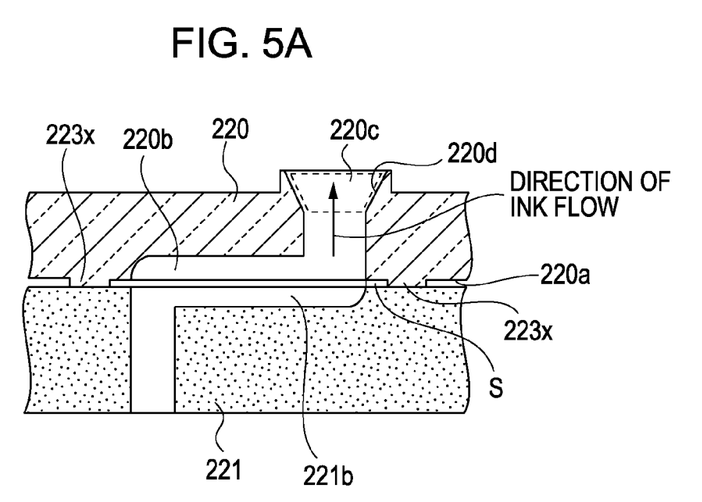
FIGS. 5A and 5B are sectional views illustrating a second embodiment of the present invention.
Figure 5B:
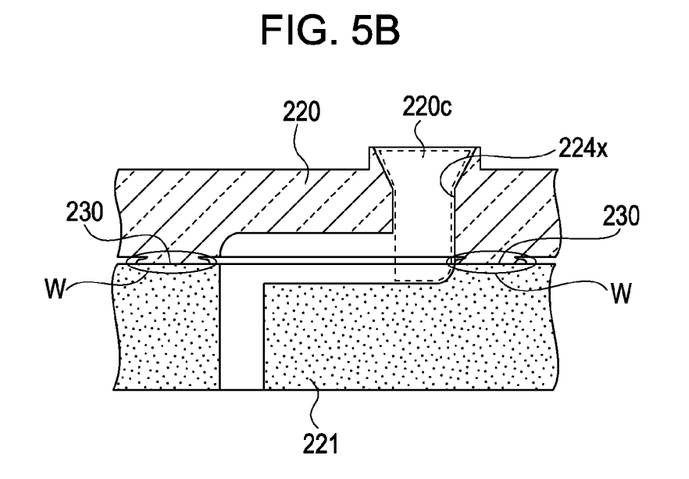

Referring to FIGS. 5A and 5B, a second embodiment of the present invention will be described. FIG. 5A illustrates the second embodiment when the transparent member 220 is made to contact the absorption member 221, and FIG. 5B illustrates the second embodiment when these members are welded to each other. The method of laser welding and the materials of the liquid supply member are the same as those in the first embodiment, and the description of these will be omitted.

As with the first embodiment, the contact portion 223x is formed on the first surface 220a so that the space S is formed between the first supply path 224x and the contact portion 223x and between the first surface 220a and the second surface 221a. Thus, protrusion of the melted portion W to the first supply path 224x is eliminated or the amount of the protrusion is reduced, so that the impedance of the ink flow can be reduced.

In the present embodiment, in order to increase the ink flow, the first supply path 224x has a tapered shape such that the cross-sectional area taken along a plane that is perpendicular to the direction of ink flow increases in the direction of the ink flow. A tapered portion 220d is formed in a surface (back surface) of the transparent member 220 opposite to the first surface 220a. In the tapered portion 220d, the cross-sectional area of the first supply path 224x increases in a direction toward the outlet (fourth opening portion 220c) of the supply path that communicates with the first opening portion 220b.

When the contact portion 223x is irradiated with a laser beam through the tapered portion 220d, there is a problem in that welding is not efficiently performed because the angle of incidence of the laser beam with respect to the transparent member 220 is large and reflection or refraction of the laser beam occurs at the incidence surface. Therefore, the surface of the transparent member 220 on which the laser beam is incident can be substantially perpendicular to the laser beam.

In the present embodiment, the tapered portion 220d is disposed so as to overlap the space S and not to overlap the contact portion 223x with respect to the direction in which the laser beam is incident (FIG. 5A). Thus, even when the tapered portion 220d is formed on a side of the supply path from which the laser beam is incident, the contact portion 223x is irradiated with the laser beam that has passed through the incident surface that is perpendicular to the direction of the laser beam, so that the contact portion 223x can be efficiently irradiated with the laser beam.

For the second supply path 224z of the embodiment illustrated in FIGS. 4C and 4D, the direction of ink flow is the same as the direction of the laser beam. Therefore, if the second supply path 224z is formed in the transparent member 220, a similar effect can be produced by providing the tapered portion to the second supply path 224z at the position described above. That is, the tapered portion may be formed as described above at the outlet of the second supply path 224z (fifth opening portion).

Third Embodiment

Figure 6A:
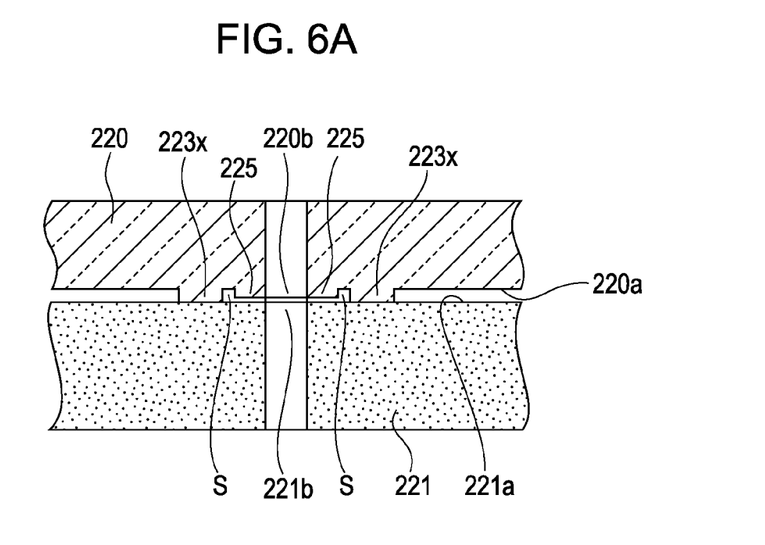
FIGS. 6A and 6B are sectional views illustrating a third embodiment of the present invention.
Figure 6B:
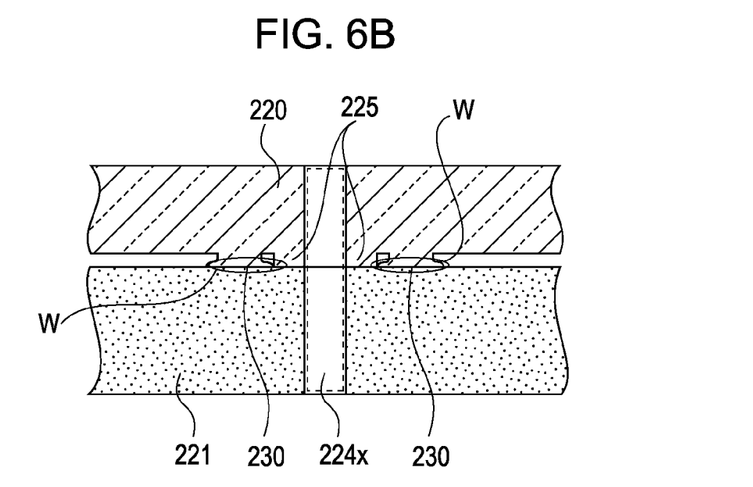

Referring to FIGS. 6A and 6B, a third embodiment of the present invention will be described. FIG. 6A illustrates the third embodiment when the transparent member 220 is made to contact the absorption member 221, and FIG. 6B illustrates the second embodiment when these members are welded to each other. The method of laser welding and the materials of the liquid supply member are the same as those for the first and second embodiments, and the description of these will be omitted.

As with the first and second embodiments, the contact portion 223x is formed on the first surface 220a so that the space S is formed between the first supply path 224x and the contact portion 223x and between the first surface 220a and the second surface 221a. Thus, protrusion of the melted portion W to the first supply path 224x is eliminated of the amount of the protrusion is reduced, so that the impedance of the ink flow can be reduced.

In the present embodiment, a protruding portion 225 is disposed between the first supply path 224x and the contact portion 223x (FIG. 6A). The protruding portion 225 is not in contact with the absorption member 221 after the transparent member 220 and the absorption member 221 are made to contact each other and before welding is performed.

Even if the melted portion protrudes to the first supply path 224x, the protruding portion 225 contacts the absorption member 221 after welding, so that flow of the melted portion to the supply path is suppressed. Therefore, even if the melted portion protrudes to the first supply path 224x, the amount of the protrusion can be further reduced. The protruding portion 225 may be disposed on the absorption member 221.

In the second supply path 224z of the modification illustrated in FIGS. 4C and 4D, the contact portion 223z is disposed along the periphery of the supply path as described above. Therefore, as compared with the third supply path 224y through which ink flows in a direction parallel to the first surface 220a and the second surface 221a, the amount of protrusion of the melted portion after welding is large. Therefore, as described in the present embodiment, by providing the protruding portion between the second supply path 224z and the contact portion 223z, the same effect can be produced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-234020 filed Oct. 8, 2009, which is hereby incorporated by reference herein in its entirety.

What is claimed is:

1. A method of making a liquid supply member for supplying liquid to a discharge port that discharges liquid, the method comprising:
  a preparation step of preparing a transparent member and an absorption member, the transparent member including a first surface in which a first opening portion is formed and the transparent member being transparent to a laser beam, and the absorption member including a second surface in which a second opening portion is formed and the absorption member being capable of absorbing a laser beam;
  a contact step of making the transparent member and the absorption member contact each other at a contact portion of a part of the transparent member and a part of the absorption member in such a manner that the first opening portion and the second opening portion overlap each other with respect to an intersecting direction that intersects the first surface and the second surface that are disposed so as to face each other; and
  a welding step of forming a first supply path by welding the transparent member and the absorption member to each other by irradiating the contact portion with a laser beam through the transparent member, the first supply path including the first opening portion and the second opening portion and being a path through which liquid flows in the intersecting direction,
  wherein, after the contact step and before the welding step, a space is formed between the contact portion and the first supply path and between the first surface and the second surface.

2. The method of making the liquid supply member according to claim 1,
  wherein, in the contact step, the transparent member and the absorption member are made to contact each other in such a manner that a part of one of the first surface and the second surface in which the opening portion is not formed and a third opening portion formed in the other one of the first surface and the second surface overlap with respect to the intersecting direction,
  wherein, in the welding step, a second supply path is formed by welding the transparent member and the absorption member to each other by irradiating the contact portion with a laser beam through the transparent member, the second supply path communicating with the first supply path, including the third opening portion, and being a path through which liquid flows in the intersecting direction, and
  wherein, after the contact step and before the welding step, a space is formed between the contact portion and the second supply path and between the first surface and the second surface.

3. The method of making the liquid supply member according to claim 1,
  wherein, in the welding step, a third supply path is formed, the third supply path including at least one of the first opening portion and the second opening portion and being a path through which liquid flows in a direction that is along the first surface and the second surface, and
  wherein, after the contact step and before the welding step, when the contact portion and the third supply path are in contact with each other without a space therebetween or when a space is formed between the contact portion and the third supply path and between the first surface and the second surface, a distance between the contact portion and the third supply path in the space is smaller than a distance between the contact portion and the first supply path in the space between the contact portion and the first supply path and between the first surface and the second surface.

4. The method of making a liquid supply member according to claim 1,
  wherein, in the welding step, the contact portion is simultaneously irradiated with laser beams emitted by a plurality of light sources that are arranged so as to correspond to the supply path.

5. A method of making a liquid discharge head including a discharge port that discharges liquid, the method comprising:
  a preparation step of preparing a transparent member and an absorption member, the transparent member including a first surface in which a first opening portion is formed and the transparent member being transparent to a laser beam, and the absorption member including a second surface in which a second opening portion is formed and the absorption member being capable of absorbing laser beam;
  a contact step of making the transparent member and the absorption member contact each other at a contact portion of a part of the transparent member and a part of the absorption member in such a manner that the first opening portion and the second opening portion overlap each other with respect to an intersecting direction that intersects the first surface and the second surface that are disposed so as to face each other; and
  a welding step of forming a first supply path by welding the transparent member and the absorption member to each other by irradiating the contact portion with a laser beam through the transparent member, the first supply path including the first opening portion and the second opening portion and being a path through which the liquid flows in the intersecting direction, wherein, after the contact step and before the welding step, a space is formed between the contact portion and the first supply path and between the first surface and the second surface.

* * * * *